United States Patent
Broman et al.

(10) Patent No.: US 9,128,235 B2
(45) Date of Patent: Sep. 8, 2015

(54) OPTICAL LIGHT DIFFUSER COMPONENT HAVING A SUBSTRATE WITH OPTICAL STRUCTURES AND OPTICAL COATINGS AND A METHOD FOR MANUFACTURING THE SAME

(75) Inventors: Mikael Broman, Helsinki (FI); Graeme Gordon, Helsinki (FI); Juha T. Rantala, Helsinki (FI)

(73) Assignee: Greenlux Finland Oy, Helsinski (FI)

( * ) Notice: Subject to any disclaimer, the term of this patent is extended or adjusted under 35 U.S.C. 154(b) by 948 days.

(21) Appl. No.: 13/058,537

(22) PCT Filed: Aug. 11, 2009

(86) PCT No.: PCT/FI2009/050654
§ 371 (c)(1),
(2), (4) Date: Feb. 11, 2011

(87) PCT Pub. No.: WO2010/018303
PCT Pub. Date: Feb. 18, 2010

(65) Prior Publication Data
US 2011/0134533 A1 Jun. 9, 2011

Related U.S. Application Data

(60) Provisional application No. 61/087,932, filed on Aug. 11, 2008.

(51) Int. Cl.
*G02B 5/02* (2006.01)
*G02B 5/00* (2006.01)
*G02B 5/18* (2006.01)

(52) U.S. Cl.
CPC .............. *G02B 5/0278* (2013.01); *G02B 5/021* (2013.01); *G02B 5/0252* (2013.01); *G02B 5/001* (2013.01); *G02B 5/1809* (2013.01); *G02B 5/1847* (2013.01)

(58) Field of Classification Search
None
See application file for complete search history.

(56) References Cited

U.S. PATENT DOCUMENTS

| 6,312,787 | B1 |  | 11/2001 | Hayashi et al. |
| 6,753,064 | B1 | * | 6/2004 | Nakama et al. ............... 428/156 |
| 7,009,771 | B2 | * | 3/2006 | Bourdelais et al. ........... 359/599 |
| 7,515,336 | B2 | * | 4/2009 | Lippey et al. ................. 359/443 |
| 8,619,363 | B1 | * | 12/2013 | Coleman ....................... 359/576 |
| 2002/0036731 | A1 | * | 3/2002 | Takahashi et al. ............ 349/112 |
| 2003/0002158 | A1 |  | 1/2003 | Masaki et al. |

(Continued)

FOREIGN PATENT DOCUMENTS

| EP | 1326101 A |  | 7/2003 |
| JP | 2003222727 A | * | 8/2003 |
| WO | WO2010/018303 A1 |  | 2/2010 |

OTHER PUBLICATIONS

International Search Report of Oct. 2, 2009.

*Primary Examiner* — Arnel C Lavarias
(74) *Attorney, Agent, or Firm* — Seppo Laine Oy

(57) ABSTRACT

An optical light diffuser component and a method of producing the same. The component includes at least one substrate material with an index of refraction of $n_1$ and at least one optical coating on the substrate having an index of refraction of $n_2$. The indices $n_1$ and $n_2$ are different. The optical light diffuser component produces uniform and diffuse light pattern from spot like light source, such as LED lamp, in terms of high optical transmission. The optical transmission is better than 90% at the visible spectrum of the light.

21 Claims, 1 Drawing Sheet

(56) References Cited

U.S. PATENT DOCUMENTS

| | | |
|---|---|---|
| 2003/0169504 A1 | 9/2003 | Kaminsky et al. |
| 2005/0094273 A1 | 5/2005 | Takao et al. |
| 2005/0157407 A1 | 7/2005 | Nishida et al. |
| 2005/0270604 A1* | 12/2005 | Drinkwater ................. 359/2 |
| 2014/0203700 A1* | 7/2014 | Inada et al. ................. 313/116 |

* cited by examiner

OPTICAL LIGHT DIFFUSER COMPONENT HAVING A SUBSTRATE WITH OPTICAL STRUCTURES AND OPTICAL COATINGS AND A METHOD FOR MANUFACTURING THE SAME

BACKGROUND OF THE INVENTION

1. Field of the Invention

The present invention relates to light diffusers and to methods for manufacturing the same. In particular, the invention relates to diffusers, which have suitable properties for use in LED lighting applications. The invention also relates to a structure and manufacturing method of these diffuser structures. In addition, the invention relates to materials and methods used to produce the diffusers.

2. Description of Related Art

Light Emitting Diode (LED) typically consists of following parts/components: A semiconductor wafer: where the light emission is produced typically in form of UV light; LED cup wherein the LED wafer is mounted using typically a solder processing, wire-bonding and encapsulation; Encapsulate material wherein phosphorous mixed when considering white light LEDs. The encapsulate material is dispensed onto the LED chip and the cup. The encapsulate material can be for example a transparent silicone or epoxy adhesive. The phosphor what is dispersed into the encapsulate converts short wavelength light (typically blue light) emitted by the LED wafer into white light; LED lens is molded on top of the LED wafer/substrate/encapsulate structure typically using the same encapsulate material than previously used with the phosphorous encapsulant area. The LED lens is used to direct the light certain way from the LED.

The above-described parts/components construct the basic single LED device with high efficiency spot light source. When constructing LED displays, display backlights or lighting units using LED's, typically an additional diffuser film or structure is provided to modify the light emission toward the viewer and particular in the LED lightning unit it is particularly important to remove the spot like phenomena and convert the light source to uniform emitter.

In recent years LED's have gained a lot of attention as a very low power consumption alternative for replacement of the conventional indoor and outdoor lighting. Due to the LED's small size it brings out a lot of different design options to construct the indoor and outdoor light sources. However, when using LED's to replace the conventional light bulbs and fluorescent tube lamps, the requirement is that the properties of the current lamps need to be met example in terms of light intensity and light emission uniformity. A "spot like" LED light emission is not desired. For this reason, one of the main challenges is to be able to create a uniform diffused light from the LED lamps towards the viewer and the ambient and at the same time minimizing the LED amount in a lamp or lighting set. Same time it is important that the light diffusion is minimally impacting to the light efficiency losses of the light system. Furthermore, the diffusion element should be light weight, robust, non-yellowing and withstand cleaning chemicals, high and low environmental temperature conditions and finally should be economical to manufacture in high volumes. Also an ideal diffuser should not be prone for fingerprint soiling.

SUMMARY OF THE INVENTION

It is an object of this invention to provide novel optical light diffuser component and a low cost and high through-put manufacturing method of highly efficient diffusers for lighting and particularly LED lighting applications. The invention also describes some examples of relevant materials that can be used for the manufacturing of the diffusers.

One particular aim of the invention is to provide a diffuser which increases light transmission from the light source toward the viewer.

Another aim of the invention is to provide a diffuser which creates uniform light emission from the LED lamp toward the viewer.

In particular, it is an aim of the present invention to provide a manufacturing means of diffuser structures for LED's using embossing (static or roll-to-roll), flexografic printing or gravure printing methods.

In particular, it is an aim of the present invention to provide material combinations, which function as optical films and structures when manufacturing of diffuser structures for optical light diffuser using embossing (static or roll-to-roll), flexografic printing, gravure printing or lithographic printing methods.

A third aim of the present invention is to provide optical structure (gratings, lenses) for generation of optical light diffuser components.

A fourth aim of the invention is to provide optical layer(s) that function as substrate layer in the optical light diffuser component.

A fifth aim of the invention is to provide optical layer(s) that function as low refractive index layer in the optical light diffuser component.

A sixth aim of the invention is to provide optical layer(s) that function as high refractive index layer in the optical light diffuser component.

A seventh aim of the invention is to provide optical layer(s) that function as protective layer for optical structure layer in the optical light diffuser component.

An eight aim of the invention is to provide optical layer(s) that function as anti-reflection coating layer for optical structure layer in the optical light diffuser component.

A ninth aim of the invention is to produce the optical light diffuser component with at least two layers of diffractive optical elements or micro-lens elements or with their combination.

DETAILED DESCRIPTION OF PREFERRED EMBODIMENTS

Figure 1:
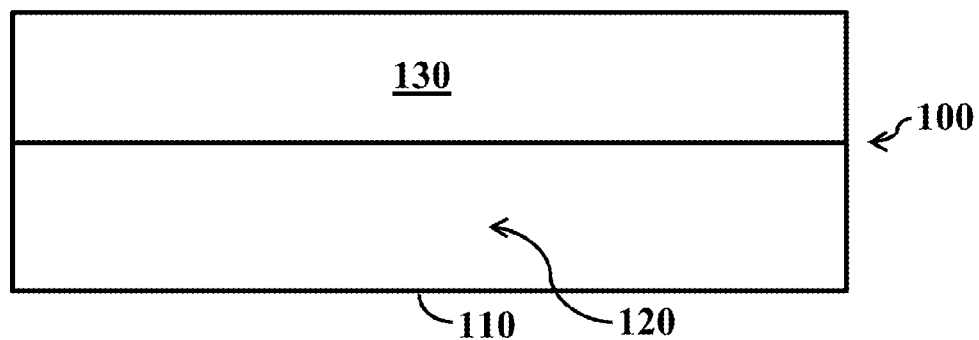
FIG. 1 shows a portion of a cross-section of an optical light diffuser component (100) having a substrate (110) comprising a substrate (110) with optical structures (120) and an optical coating (130) on the substrate (110).

For clarity, the following terms are explained.

By LED we mean a light emitting diode that is a semiconductor diode that emits light when an electrical current is applied in the forward direction of the device, as in the simple LED circuit. The effect is a form of electroluminescence where incoherent and narrow-spectrum light is emitted from the p-n junction. LEDs are widely used as indicator lights on electronic devices and increasingly in higher power applications such as flashlights and area lighting. An LED is usually a small area (less than 1 mm$^2$) light source, often with optics added to the chip to shape its radiation pattern and assist in reflection. The color of the emitted light depends on the composition and condition of the semiconducting material used, and can be infrared, visible, or ultraviolet. Besides lighting, interesting applications include using UV-LEDs for sterilization of water and disinfection of devices, and as grow light to enhance photosynthesis in plants.

By inorganic white LED we mean LED device made out of material such GaN, InGaN, GaAs or AlGaInP but not limited to these.

By organic LED we mean an organic light-emitting diode (OLED), also light emitting polymer (LEP) and organic electro-luminescence (OEL) or any light-emitting diode (LED) whose emissive electroluminescent layer is composed of a film of organic compounds. The layer usually contains monomeric or polymer substances that allows suitable organic compounds to be deposited. They are deposited in rows and columns onto a flat carrier by a simple "printing" process or in vacuum process. The resulting matrix of pixels can emit light of different colors. A typical OLED is composed of an emissive layer, a conductive layer, a substrate, and anode and cathode terminals. The layers are made of special organic molecules that conduct electricity. Their levels of conductivity range from those of insulators to those of conductors, and so they are called organic semiconductors.

By light diffuser we mean any device that diffuses or spreads out or scatters light in some manner, to give soft light. Optical diffusers use different methods to diffuse light and can include ground glass diffusers, plastic diffusers, holographic diffusers, opal glass diffusers, and greyed glass diffusers.

By diffractive optical element (DOE) we mean a modern class of optics that operates on the principle of diffraction. Traditional optical elements use their shape to bend light. Diffractive optics work by breaking up incoming waves of light into a large number of waves, which recombine to form completely new waves. DOEs can commonly function as gratings, lenses, aspherics or any other type of optical element. They can be fabricated in a wide range of materials such aluminum, silicon, silica, plastics, etc. providing the user greater flexibility in selecting the material for a particular application. For transmission DOEs the material used for the fabrication has to be transparent in the selected wavelength range.

By micro-lens we mean small lenses, generally with diameters less than a millimeter (mm) and often as small as 10 micrometers ($\mu$m). A typical micro-lens may be a single element with one plane surface and one spherical convex surface to refract the light. Because microlenses are so small, the substrate that supports them is usually thicker than the lens and this has to be taken into account in the design. More sophisticated lenses may use aspherical surfaces and others may use several layers of optical material to achieve their design performance. A different type of micro-lens has two flat and parallel surfaces and the focusing action is obtained by a variation of refractive index across the lens. These are known as gradient-index (GRIN) lenses. Some micro-lenses achieve their focusing action by both a variation in refractive index and by the surface shape. Still, another class of microlens, sometimes known as micro-Fresnel lenses, focus light by refraction in a set of concentric curved surfaces. Such lenses can be made very thin and lightweight. Binary-optic micro-lenses focus light by diffraction. They have grooves with stepped edges or multi-levels that approximate the ideal shape. They have advantages in fabrication and replication. Micro-lens arrays contain multiple lenses formed in a one-dimensional or two-dimensional array on a supporting substrate. If the individual lenses have circular apertures and are not allowed to overlap they may be placed in a hexagonal array to obtain maximum coverage of the substrate. However there will still be gaps between the lenses which can only be reduced by making the micro-lenses with non-circular apertures.

By embossing we mean a process of creating a three-dimensional image or design in substrate materials such as plastics films or layers. It is typically accomplished with a combination of heat and pressure on the substrate or the layer. Also the embossing tool may be heated to enhance the process. By embossing we also mean terms such as imprinting or nano-imprinting.

By printing we mean various general printing methods known by the art such as flexographic, embossing, imprinting, gravure and ink-jet, photolithographic printing but not limited to these.

By roll-to-roll processing we mean (also known as 'web' processing) a process of creating optical or electronic devices on a roll of flexible plastic or metal foil. Large circuits or optical elements made with thin-film transistors, diffractive optics, micro-optics and other devices can be easily patterned onto these large substrates, which can be up to a few meters wide and several km long. Typically the substrate is taken from a roll and then collected back to a roll before and after processing the substrate. Sometimes the substrate is only taken off from the roll but not collected to one. The substrate may be further coated or laminated during the processing in terms of printing methods, roll coating, spray coating or vacuum coating.

By photolithography we mean microlithography and nanolithography that refer specifically to lithographic patterning methods capable of structuring material on a fine scale. Typically features smaller than 10 micrometers are considered microlithographic, and features smaller than 100 nanometers are considered nanolithographic. Photolithography is one of these methods, often applied to semiconductor manufacturing of microchips. Photolithography is also commonly used in fabricating MEMS devices. Photolithography generally uses a pre-fabricated photomask or reticle as a master from which the final pattern is derived. Although photolithographic technology is the most commercially advanced form of nanolithography, other techniques are also used. Some, for example electron beam lithography, are capable of much higher patterning resolution (sometime as small as a few nanometers). Electron beam lithography is also commercially important, primarily for its use in the manufacture of photomasks. Electron beam lithography as it is usually practiced is a form of maskless lithography, in that no mask is required to generate the final pattern. Instead, the final pattern is created directly from a digital representation on a computer, by controlling an electron beam as it scans across a resist-coated substrate. Electron beam lithography has the disadvantage of being much slower than photolithography. In addition to these techniques, a large number of promising microlithographic and nanolithographic technologies exist or are emerging, including nanoimprint lithography, interference lithography, X-ray lithography, extreme ultraviolet lithography, and scanning probe lithography. The photolithographic process can be conducted in terms of positive and negative tones process as known by the art.

By plastic we mean polymeric materials know by the art, films, coatings or liquid solutions, such as polyethylene terephthalate, polyethylene naphthalate, polycarbonate, polymethylmethacrylate, polysulfonate, acrylonitrile butadiene styrene or polyolefin or they combinations but not limited to those.

By polysiloxane coating we mean a coating produced from monomeric, oligomeric or polymeric siloxane material. The siloxane material is formed by hydrolyzing at least one hydrolysis sensitive silicon monomer unit such as tetraethoxy silane, methyl triethoxy silane, dimethyl diethoxy silane, methyl trichlorosilane or their combination but not limited to these. Further, the hydrolyzed monomers can be condensation polymerized with or without polymerization catalyst to form oligomeric or polymeric materials which molecular weight is typically higher 500 g/mol and the Mw may reach more than 1,000,000 g/mol.

By metal organic coating we mean a coating produced from monomeric, oligomeric or polymeric metal oxide material. The metal oxide material is formed by hydrolyzing at least one hydrolysis sensitive metal oxide monomer unit such as tetraethoxy titanate, tetrachloro titanate, tantalum pentachloride or their combination but not limited to these. Further, the hydrolyzed monomers can be condensation polymerized with or without polymerization catalyst to form oligomeric or polymeric materials which molecular weight is typically higher 500 g/mol and the Mw may reach more than 1,000,000 g/mol.

The present invention describes an optical light diffuser component (100) which comprises at least one substrate layer (110) and at least one optical coating layer (130) on the substrate (110). Moreover, the invention describes an optical light diffuser component, which comprises optical structures (120) that are in particular micro-optical diffractive or refractive structures. According to the present invention the micro-optical structures, such as diffraction gratings or micro-lens(es), are printed in terms of, for example, embossing on the substrate either directly to substrate or directly to the optical coating on the substrate or printed directly to the substrate and the optical coating combination. An example of which is shown in FIG. 1.

According to any embodiment of the present invention, the component may contain several substrate layers and optical coating layers incorporated together to produce optical light diffuser. The substrates and layers may function as supportive structure, mechanical or chemical protective structure, antireflection layer, anti fingerprint soiling layer, optical spacing layer, contain several different kinds of diffractive or micro-lens lens for the optical light diffuser component.

Figure 2:
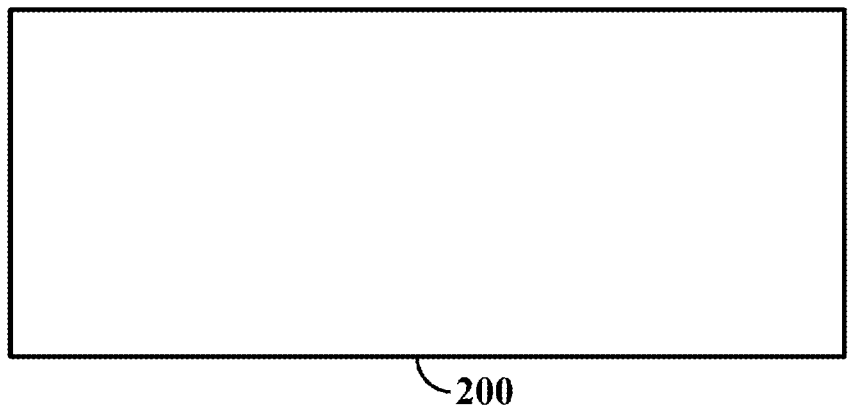
FIG. 2 shows spot like light source (200).

The optical light diffuser component of the invention produces uniform and diffuse light pattern from spot like light source (200) such as LED lamp, for example in FIG. 2, in terms of high optical transmission. The optical transmission of the provided optical light diffuser is better than 70% and more preferably better than 90% and even more preferably better than 95% at the visible spectrum of the light.

The substrate and the optical layer of the invention have at least two different indices of refraction, $n_1$ and $n_2$, respectively. Typically the substrate has index of refraction ($n_1$) of 1.4 to 1.7 and the optical layer has index of refraction either below 1.4 or above 1.7 at the 633 nm wavelength range.

According this invention the optical light diffuser component produces for $0^{th}$ diffraction order less than 50% of the light intensity when considering diffractive optical elements as optical structure in the component. The less than 50% light intensity at the $0^{th}$ diffraction order may be obtained with one or more layers of diffractive optical elements or with combination of diffractive and micro-lens elements.

The optical light diffuser component of the invention is produced in term of printing process such as embossing but not limited to that. According to the invention the printing process produces optical coating or optical structures for the component. The optical coating may also function as an optical structure in the component. The optical structures can be embossed to the substrate before coating is provided on the substrate. The coating on the substrate can be conformal, partially conformal or planarizing. Alternatively, the optical structures can be embossed when the substrate is first coated with an optical layer. More optical structures, optical coatings or substrates can be processed or incorporated part of the optical light diffuser component after the first optical structures or optical layer.

Also according to this invention the substrate may contain several optical layers prior processing thus the substrate is an optical laminate structure.

Optical micro- and nano-structures such DOEs may be produced e.g. by embossing directly into a substrate, such as plastics (polycarbonate, polyethylene terephthalate, polyethylene naphthalate), or into a surface layer of a substrate coated with a material layer. This material layer may be a lacquer or polymer which has suitable properties for micro- and nano-structuring. The substrate or material layer is chosen the way that it has suitable properties to be functional as the optical micro- and nano-structure. The produced optical micro- or nano-structure can be further coated with an additional material layer(s) and this subsequent material layer(s) can planarize the underlying optical structure or film or form a conformal coating or additionally this subsequent layer can be also micro- or nano-structured on top of the original materials layers or substrate. In general, embossing is carried out the following way. The substrate (or coated substrate) is pressed between an embossing member and a backing member in the embossing process. The surface of the embossing member comprises micro- or nano-structures, which correspond to the micro- or nano-structure to be produced. The backing member supports the substrate from the backside during the embossing process such that a sufficient pressure, the embossing pressure, may be directed to the substrate (or material layer on substrate) in order to shape the surface to correspond to the embossing member surface image. It may be advantageous for the shaping of the surface of the substrate (or material layer on substrate) if the surface layer is plasticized by heating, cured by using UV light or the embossing pressure is adjusted. Static embossing and roll-to-roll embossing are typical options. Other possible techniques for producing the Optical micro- or nano-structures on a substrate are hot foil stamping, flexographic printing and rotogravure printing.

For the production of optical micro- and nano-structures, typically the embossing member may consist of a shim which is provided with the embossing pattern and which corresponds to the micro- or nano-structures to be produced on the surface of the substrate (or on the material layer on substrate). The mentioned shim is placed onto the surface of the embossing member.

Optical diffusers for LEDs can be constructed by diffractive and refractive optical surfaces. These include gratings such as binary and blazed gratings, kinoforms and different lens structures. The feature sizes may be comprised of pattern sizes between few tens of nanometers to few millimeters. By feature we mean grating period, lens diameter, lens sag, structure width and height on the substrate. If using a diffractive grating for construction of LED diffuser it is beneficial to have the period of the grating to be in order of magnitude of the wavelength of light. In case of the white LED this has to be optimized for a broad range of wavelengths to achieve optimal performance.

MATERIAL SYNTHESIS EXAMPLES

High Refractive Index Material Synthesis Example
(Metal Oxide Material)

600 grams of Titanium (IV) isopropoxide was placed to reactor flask. 470 grams of titanium tetrachloride was added to the reactor. 3760 ml of methanol was added to the reactor and stir the reaction solution for 2 hours. Methanol was distilled using membrane pump, distillation apparatus and oil bath. 2872 grams of 2-isopropoxyethanol was added to the material flask. Solution was allowed to cool down to −6° C. 1013 g of triethylamine was added in a way that the material solution temperature is kept between −6° C. and 6° C. during triethylamine addition. Solution was pre-filtrated using Buchner funnel. Solution continued to be cooled down in the reactor over night. Finally the solution was filtrated using a filter paper. Solution was formulated to the final processing solvent 2-isopropanol and was ready for processing after final filtration. When the synthesized material is coated and thermally cured between 100 to 200degC. the coating results in index of refraction above 1.7 at 633 nm wavelength range.

Low Refractive Index Material Synthesis Example 1 (Polysiloxane Polymer I)

Trifluoropropyltrichlorosilane (26.38 g, 0.1139 mol) and allyltrichlorosilane (13.32 g, 0.07596 mol) were weighed to a round bottom flask. 183 g of dichloromethane (DCM) was added. This clear DCM solution was added using a dropping funnel to another flask in an icebath containing a DCM:$H_2O$ solution 23 ml:160 ml. The DCM solution was added in 60 min. The temperature was maintained during addition between 2 and 5° C. After addition, the reaction mixture was stirred at room temperature (RT) for 120 min. After this the reaction mixture was placed in a separation funnel and 120 g of DCM was added. The DCM and $H_2O$ layers were separated. The DCM phase was extracted six (6) times using 65 ml of distilled water in each extraction run. The pH of the DCM-phase was, after the last extraction, neutral. The DCM-layer was filtrated once using a filter paper. DCM was removed by evaporation (p=400-2 mbar, T(bath)=40° C.). The vacuum was maintained below 18 mbar for 5 min. After this, the clear material was kept under high vacuum (p=1-2 mbar) for 60 min 44.74 g of methyl tert.-butylether (MTBE) and 44.78 g of p-xylene was added to the material. The material was allowed to dissolve in the solvents overnight. 0.65 g of triethylamine (TEA) was added to this solution. The solution of the materials was refluxed for 90 minutes using a refluxing system designed to circulate the solvents in the system. 44.90 g of HCl:$H_2O$ (1:5) was added to the material and stirred for 30 min. The solution was transferred to a separation funnel 134 g of MTBE was added. The MTBE-xylene phase was extracted six (6) times using 65 ml of distilled water. The pH of the water layer after the last extraction step was neutral. The MTBE-xylene layer was filtrated once using filter paper. MTBE was removed by evaporation using p=300-250 mbar, T(bath)=40° C., rot=130 rpm. 24.70 g of PGMEA was added. Rest of the solvents was removed by evaporation using p=250-10 mbar, t(bath)=40-70° C., rot=130-20 rpm.

The clear material was kept under high vacuum (p=1-2 mbar) for 60 min 130 wt-% of propyleneglycol monomethylether acetate (PGMEA), 300 wt-% of ethyl lactate and 1 wt-% of BYK-306 were added to the material and stirred over a night. The material was ready for use. When the synthesized material is coated and thermally cured between 100 to 200° C. the coating results in index of refraction below 1.4 at 633 nm wavelength range.

Low Refractive Index Material Synthesis Example 2 (Polysiloxane Polymer II)

Methyltriethoxysilane (632 g, 50 mol %) and tetraethoxysilane (800 g, 50 mol %) were weighed to a round bottom flask. 3303.68 g of IPA was added to the round bottom flask. 969.28 g of water (0.01 M $HNO_3$) was added to the reaction flask within 5 min, while constantly stirring the reaction mixture using a magnetic stirrer. After this the reaction mixture was stirred at room temperature (in the following abbreviated "RT") for 17 min and refluxed for 5 hours using electric mantel. After the refluxing, most of the acetone was removed from the reaction mixture using a rotary evaporator (pressure 350→250 mbar, t(bath)=50° C.). After most of the acetone had been removed, 250 g of PnP was added to the flask. The reaction mixture was evaporated further in the rotary evaporator (pressure 45 mbar, t(bath)=50° C., 1 hour) after PnP addition to perform a solvent exchange. After the solvent exchange the material solution was refluxed at 120° C. for 1 hour. After this time the material was ready for use after formulation (addition of solvents and additives) and filtration. The material was formulated to certain solid content depending on the film thickness requirements (see below) and filtrated using 0.1 μm PTFE filter. The solution was ready for use for processing in a manufacturing process. When the synthesized material is coated and thermally cured between 100 to 200° C. the coating results in index of refraction below 1.3 at 633 nm wavelength range.

EXAMPLES FOR MANUFACTURING THE LED DIFFUSERS

Substrate materials that can be used are typically polymers, such as polycarbonate or polyethylene terephthalate. Thickness of the substrate can vary typically from 10 μm to several millimeters. Thicker substrates are chosen if the substrate itself is required to have a structural or mechanical role in the diffuser construction or integration requirements demand this.

Example 1

The substrate surface is patterned directly using for example embossing processing. The diffuser is cut to size from the larger substrate used in the embossing process or used as is. The cut substrate may be required to be deformed after cutting if some additional curvature or such is required to have in the diffuser.

Example 2

The substrate surface is patterned directly using for example embossing and then coated (planarized or conformally coated) with a material layer. This material layer may give beneficial optical properties to the diffuser device or may have a mechanical protecting function. The diffuser is cut to size from the larger substrate used in the embossing process or used as is. The cut substrate may be required to be deformed after cutting if some additional curvature or such is required to have in the diffuser.

Example 3

The substrate is first coated with one material layer and then the material layer on the substrate is patterned for example by embossing. The material layer used for patterning the structure has beneficial optical properties to the diffuser device fabrication (such as optimized refractive index to work as optical structure) or may have improved mechanical properties when compared to the substrate itself. The diffuser is cut to size from the larger substrate used in the embossing process or used as is. The cut substrate may be required to be deformed after cutting if some additional curvature or such is required to have in the diffuser.

Example 4

The substrate is first coated with two material layers and then the material layers on the substrate are simultaneously patterned by, for example, embossing. The material layers used for patterning the structure have beneficial optical properties to the diffuser device fabrication (such as optimized refractive index to work as optical structure) or may have improved mechanical properties when compared to case where only substrate is used or one material layer. The diffuser is cut to size from the larger substrate used in the embossing process or used as is. The cut substrate may be required to be deformed after cutting if some additional curvature or such is required to have in the diffuser.

Example 5

The substrate is first coated with a material layer and then the material layer on the substrate is patterned by, for example, embossing. A subsequent material layer is coated on top of this and this second material layer is patterned by example embossing. By using two embossed layers one can realize beneficial optical properties to the diffuser device. The diffuser is cut to size from the larger substrate used in the embossing process or used as is. The cut substrate may be required to be deformed after cutting if some additional curvature or such is required to have in the diffuser.

Example 6

The substrate is first coated with a material layer and then the material layer on the substrate is patterned by, for example, embossing. A subsequent material layer is coated on top of this patterned layer to planarize or conformally coat the embossed optical structures. This additional material layer may give beneficial optical properties to the diffuser device or may have a mechanical protecting function. The diffuser is cut to size from the larger substrate used in the embossing process or used as is. The cut substrate may be required to be deformed after cutting if some additional curvature or such is required to have in the diffuser.

Example 7

In this example the basic housing (structural or mechanical) and the actual manufactured diffuser film are two different "substrates". The basic housing takes care of the construction or integration requirements for the diffuser. The diffuser film can be manufactured as described in Examples 1 to 6. Once the diffuser film is cut to size from the larger substrate used in the embossing process it is laminated or attached by other means permanently on top of the basic housing. These two different substrates construct the diffuser.

Example 8

The diffuser is manufactured as described in Example 7, but with the difference that the diffuser film (or part of the diffuser film) is not attached permanently on top of the basic housing. The diffuser film is attached such a way that it is replaceable.

Example 9

The diffuser is manufactured as described in Example 7 or 8, but with the difference that the two separate diffuser films are used on top of each other. These two diffuser films can be identical or have different optical functions.

Example 10

The diffuser is manufactured as described in Example 7, but with the difference that the diffuser film (or part of the diffuser film) is not attached permanently on top of the basic housing. The diffuser film is attached such a way that it is replaceable. In addition to the diffuser properties the diffuser film is patterned to contain hologram features. The hologram features can be also attached on the diffuser film as separate films. The holograms can have example decorative purposes.

When manufacturing the device according to Example 4 the following method can be used: The material of the substrate is a 500 μm thick polyethylene terephthalate (film). On top the substrate a PMMA based laquer is deposited using a gravure or roll-to-roll printing. On top of this the high refractive index material is deposited and simultaneously embossed to produce the desired optical structure. It would be possible to use only the PMMA based laquer in the manufacturing of the optical structure, but the high refractive index coating on top gives the optical structures some beneficial properties. The high refractive index layer functions as a mechanical protection layer for the optical structure and also increases the refractive index contrast between the air and the optical structure which is beneficial in some cases.

When manufacturing the device according to Example 3 the following method can be used: A 500 μm thick PET film is used as a substrate. On top of the substrate a polysiloxane polymer (polysiloxane polymer II) from the low refractive index polymer example is deposited using a gravure or roll-to-roll printing and simultaneously embossed to produce the desired optical structure. The structure thus produced combines optical structures and anti-reflection coating as a single component.

Diffuser structures in examples 1 to 10 are particularly suitable to be used in lighting fixture and armatures lid up by LED components. Therein the diffuser functions as light diffusing element for light generated by multiple point like LED light emitting devices. The LEDs can be assembled behind the diffuser as perpendicular to the plane or orthogonal at the edge of the diffuser.

The invention claimed is:
1. An optical light diffuser component comprising:
 a) at least one substrate comprised of a substrate material with an index of refraction of n1;
 b) at least one optical coating on the substrate having an index of refraction of n2; wherein n1 is different from n2; and wherein the substrate further comprises optical structures in the substrate material and the optical coating is formed directly on the optical structures, and wherein the optical coating on the substrate produces a uniform and diffuse light pattern from a spot like light source.
2. The component of claim 1, wherein n2 is smaller than 1.4 at a wavelength range of 633 nm and n1 is greater than n2.
3. The component of claim 1, wherein n2 is greater than 1.7 at a wavelength range of 633 nm and n1 is smaller than n2.
4. The component of claim 1, wherein the substrate material has an index of refraction between 1.4 and 1.7 at a wavelength range of 633 nm.
5. The component of claim 1, wherein the optical structures comprise diffractive elements which are in maximum 1000 nm in width and 1000 nm in length.
6. The component of claim 1, wherein at least one of a diffraction efficiency at the 0th diffraction order and a reflection efficiency is 50% or less.
7. The component of claim 1, wherein the optical layer (b) is also an antireflection coating for the optical diffuser component.
8. The component of claim 1, wherein there are at least 2 layers of diffractive elements in the diffuser component and the diffractive elements are horizontally positioned at a 90 degree angle relative to each other.

9. The component of claim 1, wherein there are at least 2 layers of diffractive elements in the diffuser component and the diffractive elements are separated from each other with one or more optical layer.

10. The component of claim 9, wherein an optical separation layer has an index of refraction different from that of the diffractive elements.

11. The component of claim 1, wherein the optical coating (b) is a polysiloxane polymer or a metal organic polymer.

12. The component of claim 1, wherein there are at least two optical coatings and one is polysiloxane polymer and another one is metal organic polymer.

13. The component of claim 1, wherein there are at least two diffractive elements on the substrate (a) and at least one of them is on opposite site of the substrate.

14. The component of claim 1, wherein the optical structures are transmission diffractive optical elements.

15. The component of claim 1, wherein there are at least 2 layers of micro-lens elements in the diffuser component and the micro-lens elements are not vertically aligned when compared each other.

16. A method producing optical light diffuser component comprising the steps of
   a) providing a substrate containing diffractive elements; and
   b) forming on the diffractive elements an optical coating layer, wherein the optical layer and the diffractive elements have different index of refraction such that the optical layer and diffractive elements produce a uniform and diffuse light pattern from a spot like light source.

17. The method of claim 16, wherein the optical layer is formed from a polysiloxane polymer or metal organic material.

18. The method of claim 16, wherein the optical layer has an index of refraction of less than 1.4 at a wavelength range of 633 nm.

19. The method of claim 16, wherein the optical layer is thermally or Ultraviolet (UV) cured after coating.

20. The component of claim 1, wherein the optical structures are reflection diffractive optical elements.

21. The component of claim 1, wherein an optical transmission of the component is better than 70%.

* * * * *